United States Patent
Anderson

[11] 3,891,066
[45] June 24, 1975

[54] KEYWAY DRIVE FOR MULTIPLE DISC BRAKE

[75] Inventor: Bruce W. Anderson, South Bend, Ind.

[73] Assignee: The Bendix Corporation, South Bend, Ind.

[22] Filed: May 14, 1973

[21] Appl. No.: 359,809

Related U.S. Application Data

[63] Continuation of Ser. No. 168,273, Aug. 2, 1971, abandoned.

[52] U.S. Cl......... 188/73.2; 188/218 XL; 192/70.2; 192/107 R
[51] Int. Cl. ........................................... F16d 65/12
[58] Field of Search ........ 188/77.2, 218 XL, 251 A; 192/107 R, 70.2

[56] References Cited
UNITED STATES PATENTS
| | | | |
|---|---|---|---|
| 3,487,903 | 1/1970 | Stickan | 192/70.2 X |
| 3,650,357 | 3/1972 | Nelson et al. | 188/71.5 |
| 3,718,210 | 2/1973 | Dernovshek et al. | 188/218 XL |

Primary Examiner—George E. A. Halvosa
Attorney, Agent, or Firm—Gordon H. Chenez; W. N. Antonis

[57] ABSTRACT

A plurality of keyway members fixedly secured in circumferentially spaced-apart relationship to an annular ring and adapted to bear against mating surfaces formed on the periphery of an annular carbon friction disc having a radially extending portion retained by the ring.

7 Claims, 7 Drawing Figures

PATENTED JUN24 1975 3,891,066
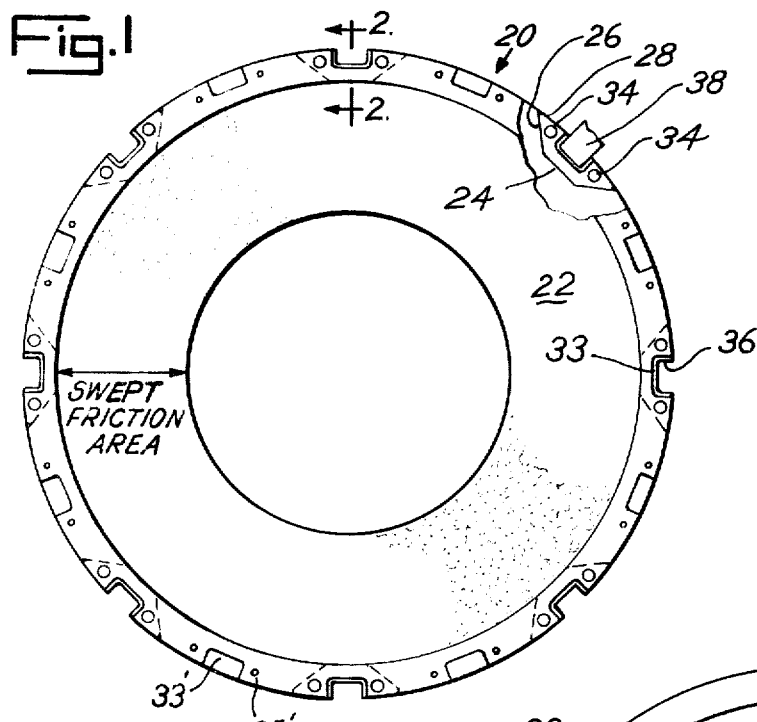
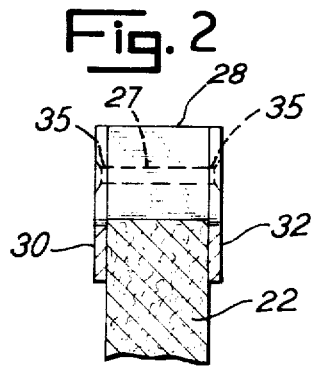
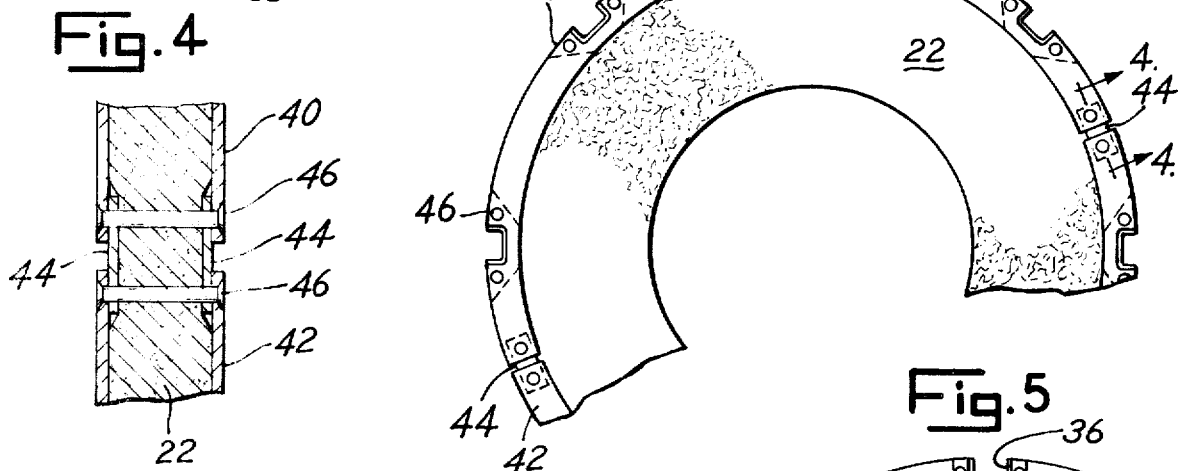
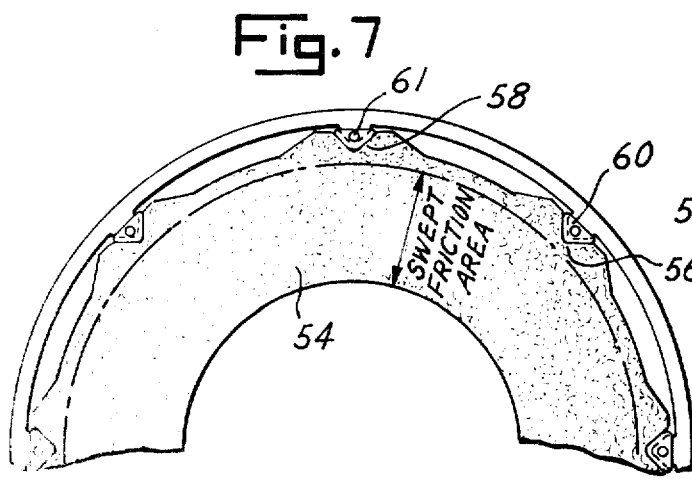
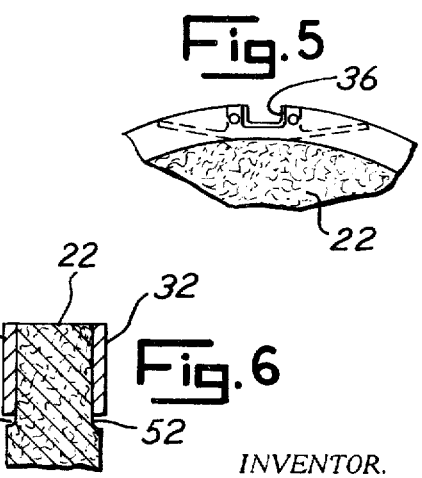
INVENTOR.
BRUCE W. ANDERSON
BY
Gordon H. Chenez
AGENT

KEYWAY DRIVE FOR MULTIPLE DISC BRAKE

This is a continuation of application Ser. No. 168,273 filed Aug. 2, 1971, and now abandoned.

BACKGROUND OF THE INVENTION

High capacity multiple disc brakes particularly of the aircraft type have been designed and used with rotor and/or stator members which are formed of annular discs of carbon material which carbon material possesses desirable characteristics such as heat sink capability and ability to withstand high temperatures generated as a result of braking large heavy jet aircraft which land at relatively high speed and must be decelerated in a relatively short runway distance. However, such carbon material has a significant disadvantage in that the strength thereof is weak in shear and tension and greatest in compression. As a result, conventional keyslot arrangements wherein localized loads are imposed by the key on the slot are not entirely satisfactory for use with carbon material which is subject to structural failure in the tension or shear mode well under the force loads normally expected in high capacity aircraft brakes.

SUMMARY OF THE INVENTION

Reference is made to U.S. Pat. No. 3,237,731 issued Mar. 1, 1966 to W. H. DuBois for details of conventional key-slot drive structure as used in an aircraft disc brake. The present invention includes an annular friction disc formed of carbon material and shown in the form of a brake rotor disc adapted to be driven at the radially outermost portion thereof by a plurality of conventional key members fixedly secured to a wheel member, not shown. The annular rotor is provided with a plurality of circumferentially spaced-apart generally V-shaped notches adapted to receive associated mating V-shaped drive keys which bear against the inclined sides of the V-shaped notches thereby distributing applied load against the carbon rotor to minimize tension and shear effect thereon.

The annular carbon rotor may be contained radially by an annular metal ring having circumferentially spaced-apart slotted V-shaped drive members fixedly secured thereto. The slotted portion of the drive members receives a mating drive key of a wheel member and the inclined sides of the V-shaped drive member bear against the corresponding inclined sides of the V-shaped notches of the carbon rotor thereby eliminating direct bearing of the wheel drive key against the carbon rotor.

The annular metal ring may be continuous or in segments suitably secured together.

It has been found that the carbon material will perform satisfactorily if the force loads directed thereagainst are substantially restricted to a compression mode and distributed over a maximum area.

It is an object of the present invention to provide keyslot force transmitting means for a multiple disc brake having rotor or stator members formed of carbon material or similar material characteristically weak in tension and shear.

It is another object of the present invention to provide key-slot force transmitting means for coupling a non-metallic rotor or stator member to corresponding rotatable or fixed members of a disc brake.

BRIEF DESCRIPTION OF THE DRAWINGS

FIG. 1 represents a plan view of a brake rotor disc embodying the present invention;

FIG. 2 represents a sectional view taken on line 2—2 of FIG. 1;

FIG. 3 represents a modified form of the brake rotor disc of FIG. 1;

FIG. 4 represents a section view taken on line 4—4 of FIG. 3;

FIG. 5 represents a modified form of the keyway drive portion of FIG. 1;

FIG. 6 represents a modified form of FIG. 2;

FIG. 7 represents another embodiment of the present invention.

DESCRIPTION OF THE PREFERRED EMBODIMENT

Referring to FIGS. 1 and 2, numeral 20 designates a rotor disc provided with an annular friction member 22 formed of structural carbon or similar material having desirable wear as well as temperature resistant characteristics but which has the undesirable characteristic of being relatively weak in tension and/or shear modes and incapable of sustaining significant force loads creating such tension and/or shear without structural failure.

The radially outermost portion of the annular member 22 is provided with a plurality of circumferentially spaced-apart notches or recesses 24 having inclined sides 26 of the angle of inclination of which may vary depending upon the expected force capacity of the rotor disc 20. Each notch 24 is adapted to receive a mating wedge-shaped metal drive member 28 having inclined sides the angle of which corresponds to that of associated notch 24. Spaced-apart rivet receiving openings 27 are provided in the wedge-shaped drive members 28.

The wedge-shaped drive members 28 are interposed between annular retaining rings 30 and 32 having circumferentially spaced-apart notches 33 and fixedly secured to drive members 28 by suitable fastening means such as rivets 34, which extend through spaced-apart openings 35 in rings 30 and 32 and mating openings 27 of drive members 28. The radially outermost portion of the carbon member 22 is trapped between retaining rings 30 and 32 thereby fixing the relative positions thereof. A transverse slot 36 formed in each of the wedge-shaped drive members 28 is aligned with associated notches 33 of rings 30 and 32 and adapted to slidably engage a drive key 38 carried by a wheel, not shown.

Referring to FIGS. 3 and 4, each of the retaining rings 30 and 32 may be formed of two or more arcuate portions 40 and 42 joined by link members 44 and connecting rivets 46. The link members 44 may abut the inside surfaces of adjacent arcuate portions 40 and 42 in which case the carbon member 22 is recessed as at 48 to accommodate the link members 44. Obviously, the link members 44 may be placed on the outside of arcuate portions 40 and 42 if axial clearance between the retaining rings 30 and 32 and adjacent structure is no problem. The split retaining ring formed by arcuate portions 40 and 42 has the advantage of simpler disassembly over the continuous rings 30 and 32 of FIG. 1 to replace the carbon member 22. In the split ring of FIG. 3, only the rivets 46 need be removed without disturbing the wedge-shaped members 28 whereas in the continuous ring of FIG. 1 the rivets 34 and thus wedge-shaped members 28 must be removed.

Referring to FIG. 5, a wedge-shaped drive member 28 having sides with relatively small angles of inclination may be reduced in weight by eliminating a portion of the metal between the slot 36 and adjacent inclined sides 26.

Referring to FIG. 6, the outermost portion of carbon member 22 may be recessed on opposite sides thereof as at 50 and 52 to accommodate retaining rings 30 and 32 thereby reducing the overall thickness of the outermost portion of the rotor disc 20 accordingly.

Referring to FIG. 7, an annular carbon rotor disc 54 is provided with circumferentially spaced-apart notches or recesses 56 having inclined sides 58. Each notch 56 is adapted to receive an associated one of a plurality of circumferentially spaced-apart V-shaped key members or wedge-shaped members 60 fixedly secured to a wheel rim 64 by a pin, screw or rivet 61. The inclined sides of wedge-shaped member 60 bear against the inclined sides 58 of notches 56 to thereby distribute the applied load against carbon disc 54 in the same manner as wedge-shaped members 28 of FIG. 1.

It will be recognized that the keyway drive structure is equally applicable to a brake stator in which case the radially innermost portion of the carbon member 22 would be provided with the notches 24 and associated rings 30, 32 and wedge-shaped members 28.

The rings 30 and 32 and drive members 28 may be removed from a worn annular friction member 22 and reused repeatedly on new friction members 22 in which case previously used rivet openings 35 in rings 30 and 32 may or may not have become enlarged to such an extent that a satisfactory rivet fit cannot be attained. In such a case, unused additional slots 33' and associated openings 35' provided in rings 30 and 32 may be utilized in place of the unusable openings 35.

I claim:

1. Key slot apparatus for a multiple disc brake comprising:
   a unitary, one piece, annular friction disc provided with a plurality of peripheral spaced-apart axially extending notches having inclined sides defining a generally v-shaped slot;
   a plurality of circumferentially spaced-apart axially extending wedge-shaped members each having inclined sides bearing against said inclined sides of said notches in force transmitting relationship wherein the angle of inclination of said sides is selected to effectively minimize the force per unit area imposed on said friction disc and maximize the radially directed force component derived therefrom and imposed on said friction disc; and
   first and second integral annular retaining rings abutting opposite side portions of said annular friction disc;
   said wedge-shaped members being interposed between said first and second annular retaining rings, said annular retaining rings being fixedly secured soley to said wedge-shaped member to provide the sole force transmitting medium between said annular friction disc and said first and second annular retaining rings.

2. Key-slot apparatus as claimed in claim 1 wherein: said wedge-shaped members are each provided with a slot adapted to slidably engage a drive key.

3. Key-slot apparatus as claimed in claim 1 wherein: said wedge-shaped members are secured to a rotatable wheel and movable therewith.

4. Key-slot apparatus as claimed in claim 1 wherein: said opposite side portions of said annular friction disc are recessed to accommodate said annular retaining rings.

5. Key-slot apparatus as claimed in claim 1 wherein: said wedge-shaped members are each provided with a slot and spaced-apart rivet receiving openings;
said annular retaining rings are each provided with a plurality of circumferentially spaced-apart slotted portions and associated spaced-apart rivet receiving openings adapted to mate with said slot and openings of said wedge-shaped members;
said slot and mating slotted portions are adapted to slidably engage a drive key; and
said openings in said wedge-shaped members and mating openings in said annular retaining rings having rivets extending therethrough to fixedly secure the same together.

6. Key-slot apparatus as claimed in claim 5 wherein: said annular retaining rings are provided with two sets of said circumferentially spaced-apart slotted portions and associated spaced-apart rivet receiving openings;
one of said sets providing substitute mountings for said wedge-shaped members in the event of reuse of said annular retaining rings with a new annular friction disc.

7. Key-slot apparatus as claimed in claim 1 wherein: said unitary annular friction disc is formed of carbon material.

* * * * *